Sept. 19, 1939.   G. A. CAMPBELL   2,173,709
PAN AND DISH HOLDER AND LIFTER
Filed Aug. 8, 1938
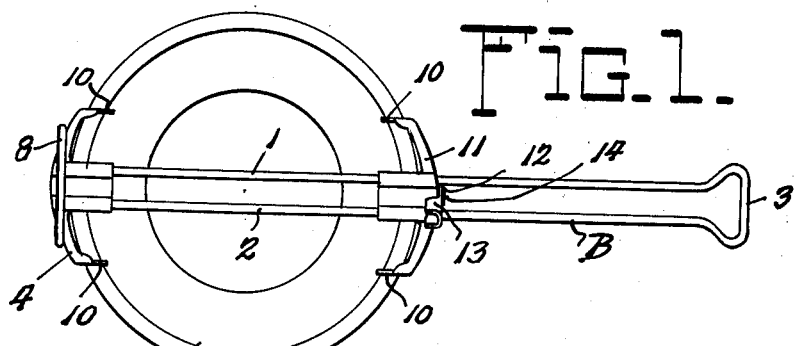
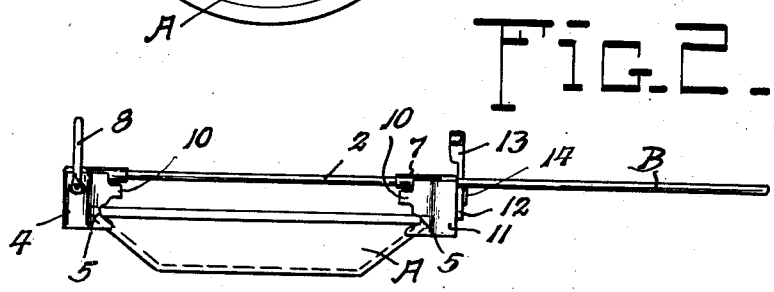
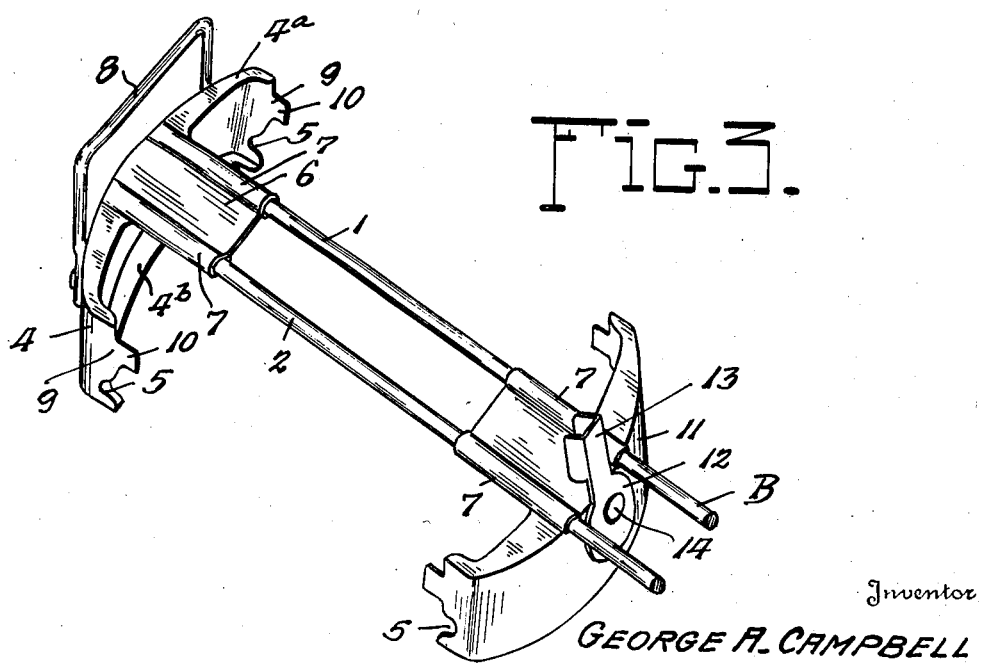
Inventor
GEORGE A. CAMPBELL
By Robert Robb
ATTORNEYS Patented Sept. 19, 1939

2,173,709

UNITED STATES PATENT OFFICE 2,173,709

PAN AND DISH HOLDER AND LIFTER

George A. Campbell, Cleveland, Ohio

Application August 8, 1938, Serial No. 223,773

6 Claims. (Cl. 294—34)

The purpose of this invention is to provide a simple, easily manufactured, and relatively cheap form of adjustable pan and dish holder and lifting appliance.

The invention comprises improvements in that type of pan and dish holders particularly adapted for the handling of hot dishes and pans in connection with stoves and ovens, to eliminate the necessity of using so-called "pot holders" of cloth or fabric form.

In carrying out the invention, I utilize a lifter frame which has a handle means at its opposite ends and which is equipped at one end with a stationary gripping member to engage one edge of the dish, pan, or the like, the intermediate portion of the lifting frame being provided with a sliding or adjustable gripping member adapted to be quickly locked and unlocked in its position on the frame for cooperation with the opposite edge portion of the dish or pan that is being lifted or held and moved from one place to the other by means of the appliance of the invention.

The invention lies primarily in the peculiar form of the lifting frame, the form and arrangement of the stationary and movable gripping means thereon, and the lock means provided on the movable gripping member for fixing its position after the two gripping members have been engaged with the pan or other receptacle to be handled.

In the accompanying drawing a preferred embodiment of the invention is illustrated, and similar reference characters refer to similar parts throughout the description and drawing.

In the accompanying drawing:

Figure 1 is a top plan view showing my invention applied to an ordinary dish, such as a pie plate, so that the latter may be readily handled when hot.

Figure 2 is a side elevation of the same.

Figure 3 is a large perspective view showing the lifting frame broken away at the handle portion and bringing out a little more clearly the formation of the jaws of the gripping member that cooperate to engage opposite edge portions of the pan, dish, or other receptacle.

Describing the invention as illustrated in the drawing, A denotes a pie plate or similar receptacle which is illustrated as being engaged by means of the holder and lifter of the invention, ready for the use of the latter for handling the plate or other dish. The appliance of the invention is designed not only for use in conjunction with round plates, but is equally useful for the handling of square dishes, plates, or the like.

Describing the invention specifically, the sides of the lifting frame are designated 1 and 2, and the said sides are preferably made of a piece of wire bent upon itself as shown at 3 whereby to form at the portion near the bend the handle member generally designated as B. At the extremities of the sides 1 and 2 opposite the bend 3 is located the stationary gripping member 4 which is preferably made of a plate stamped from sheet metal and formed at the ends thereof with jaws 5 that are adapted to engage the edge portions of the plate, pan, or other dish to be handled.

To afford sufficient rigidity, the upper and lower edges of the gripping member 4 are provided with flanges 4a and 4b, respectively. Projecting laterally from the upper edge of the gripping member 4 is an extension 6 that is formed to provide tubular parts 7, in which are disposed the adjacent ends of the sides 1 and 2 of the lifting frame. The gripping member 4 may be thus united to the parts 1 and 2 of the lifting frame by frictional binding of the tubular portion 7, welding, or soldering, as may be desired, the special mode of fastening not being material to the invention. Carried by the gripping member 4 is a U-shaped handle 8 that may be gripped by one hand of the user in the handling of the device of the invention, as will be hereinafter more fully set forth.

As a convenient means of causing the proper engagement of the jaws 5 with the edge portions of the plate or dish A, the ends 9 of the gripping member 4 are formed with outstanding lugs 10 that form stops which prevent the jaws of the gripping member 5 from passing downwardly beyond the edges of the dish A in the adjustment or attachment of the device to the dish which is to be handled.

Slidable along the lifting frame sides 1 and 2 is the movable gripping member 11 which is comprised largely of the same parts as the stationary or fixed member 4 and such parts are correspondingly designated. However, the side members 1 and 2 of the lifting frame pass entirely through the portions 7 of the gripping member 11 so that the latter may be slid freely along the lifting frame in order to provide for the gripping, holding, and lifting of different sizes of dishes, pans, or the like.

In order to prevent the liability of the gripping members 4 and 11 becoming disengaged from the dish gripped thereby, locking means for the member 11 is provided in the form of a round cam 12 operable by the handle 13 and pivoted at 14 to the outer side of the member 11. By swinging the handle 3 in either direction the cam 12 may be caused to engage with either one or the other of the side members 1 and 2 of the lifting frame, and in this way the gripping member 11 may be fixed against movement along said frame.

While the member 11 is of substantially the same form as the member 4, it is obvious that said member might be provided with only one of the jaws 5 and would be quite effective for all useful purposes when so constructed. By making the gripping members 4 and 11 so very similar, the same dies may be employed for the manufacture thereof.

Under practical conditions of use, the appliance of the invention is first arranged so that the gripping member 4 has its jaws 5 engaged with a side portion of the dish A at the edge thereof. Thereupon, the gripping member 11 is forced into engagement with the opposite portion of the dish at its edge and the locking member 13 rotated to fix the adjustment of said member 11. Then the dish A may be handled as may be desired. It may be moved about and it may be lifted by grasping the handle B and the handle 8, and carried to any suitable place of deposit.

Of course, unless the receptacle A is being lifted, it is not necessary to employ the handle 8 at all. The adaptability of the invention for use with different sized dishes is apparent, and since the jaws 5 of each gripping member are spaced in substantially the same plane transverse to the lifting frame 1, 2, the said jaws are useful in conjunction with square, oblong, and other shaped dishes, as well as the round dishes. The parts of each jaw 5 are also vertically spaced between the flanges 4a and 4b.

Having thus described my invention, what I claim as new and desire to secure by Letters Patent of the United States, is:

1. In a holder and lifter of the class described, in combination, a lifting frame, a gripping member to engage one side portion of a dish, fixed to one end of the frame, a handle at the other end of the frame, a gripping member movable lengthwise of the lifting frame intermediate its ends, and a locking member pivoted to the movable member to swing transversely to the frame and engageable with the latter to hold the movable member from movement on the frame.

2. In a holder and lifter of the class described, in combination, a lifting frame, a gripping member to engage one side portion of a dish, fixed to one end of the frame, a handle at the other end of the frame, a gripping member movable lengthwise of the lifting frame intermediate its ends, and a laterally shiftable locking member on said movable gripping member to interengage the lifting frame to hold said movable gripping member from movement when engaged with a dish or the like.

3. As a new article of manufacture, a holder and lifter comprising a lifting frame consisting of a piece of wire or the like bent upon itself at one end to provide spaced sides, a fixed gripping member secured to and receiving the ends of the spaced sides of the said frame, a movable gripping member having spaced portions through which the sides of the frame pass and slidable upon the frame, a vertically disposed cam pivoted to the movable gripping member and engageable by movement in a plane transverse to the lifting frame to engage the latter and lock the movable gripping member, each gripping member comprising jaw means including vertically spaced jaws cooperative with an edge of a pan, dish, or like receptacle.

4. A holder and lifter as claimed in claim 3, combined with a U-shaped handle affixed to the stationary gripping member, and the said gripping member having lugs projecting therefrom above the jaws with which they are formed.

5. As a new article of manufacture, a holder for plates, pans, etc., comprising a frame composed of spaced sides, a fixed gripping member consisting of a plate disposed transversely of said sides and formed with an extension having spaced tubular portions to receive the said sides at the ends thereof for fixed connection therewith, a movable gripping member constructed like the fixed gripping member but with the spaced sides of the frame passing through its tubular portions to permit the movable member to slide on the frame sides, both gripping members being provided with jaws on their adjacent sides to engage the article to be held by the holder, and a part on the movable jaw to lock it to the frame to hold it at a desired adjusted position thereon.

6. A holder constructed as claimed in claim 5, in which the plates of the gripping members are disposed to extend downwards from the frame, and have horizontal upper and lower flanges to make them rigid, the ends of the plates having a formation to provide the jaws specified, and the parts of each jaw being vertically spaced between said upper and lower flanges.

GEORGE A. CAMPBELL.